US007503488B2

(12) United States Patent
Davis

(10) Patent No.: US 7,503,488 B2
(45) Date of Patent: Mar. 17, 2009

(54) FRAUD PREVENTION IN ISSUANCE OF IDENTIFICATION CREDENTIALS

(76) Inventor: Bruce L. Davis, 15599 Village Dr., Lake Oswego, OR (US) 97034

( * ) Notice: Subject to any disclaimer, the term of this patent is extended or adjusted under 35 U.S.C. 154(b) by 540 days.

(21) Appl. No.: 10/965,232

(22) Filed: Oct. 13, 2004

(65) Prior Publication Data

US 2005/0116025 A1 Jun. 2, 2005

Related U.S. Application Data

(60) Provisional application No. 60/512,033, filed on Oct. 17, 2003.

(51) Int. Cl.
*G06K 5/00* (2006.01)
(52) U.S. Cl. .................. 235/382; 235/380; 235/375
(58) Field of Classification Search ............... 235/382, 235/380, 375
See application file for complete search history.

(56) References Cited

U.S. PATENT DOCUMENTS

| | | |
|---|---|---|
| 4,993,068 A | 2/1991 | Piosenka |
| 5,679,938 A | 10/1997 | Templeton |
| 5,790,674 A | 8/1998 | Houvener et al. |
| 5,819,226 A | 10/1998 | Gopinathan et al. |
| 5,884,289 A | 3/1999 | Anderson et al. |
| 6,072,894 A | 6/2000 | Payne |
| 6,269,169 B1 | 7/2001 | Funk |
| 6,397,194 B1 | 5/2002 | Houvener |
| 6,430,306 B2 | 8/2002 | Slocum et al. |
| 6,496,595 B1 | 12/2002 | Puchek |
| 6,513,018 B1 | 1/2003 | Culhane |
| 6,593,962 B1 | 7/2003 | Downer |
| 6,597,775 B2 | 7/2003 | Lawyer et al. |
| 6,609,658 B1 * | 8/2003 | Sehr ........................ 235/384 |
| 6,922,478 B1 | 7/2005 | Konen |
| 6,983,057 B1 | 1/2006 | Ho |
| 7,003,669 B2 | 2/2006 | Monk |
| 7,225,977 B2 | 7/2007 | Davis |
| 7,278,026 B2 | 10/2007 | McGowan |
| 7,314,162 B2 | 1/2008 | Davis |
| 2002/0124024 A1 | 9/2002 | Patterson |
| 2002/0138351 A1 | 9/2002 | Houvener |
| 2002/0147679 A1 | 10/2002 | Tardif |
| 2003/0052768 A1 | 3/2003 | Maune |
| 2003/0099379 A1 | 5/2003 | Monk et al. |
| 2003/0115459 A1 | 6/2003 | Monk |
| 2003/0149744 A1 | 8/2003 | Bierre et al. |
| 2003/0150907 A1 | 8/2003 | Metcalf |
| 2003/0154406 A1 | 8/2003 | Honarvar et al. |
| 2003/0216988 A1 | 11/2003 | Mollett et al. |
| 2004/0024693 A1 | 2/2004 | Lawrence |
| 2004/0039586 A1 | 2/2004 | Garvey |
| 2004/0049401 A1 | 3/2004 | Carr et al. |
| 2004/0059953 A1 | 3/2004 | Purnell |
| 2004/0064415 A1 | 4/2004 | Abdallah et al. |
| 2004/0083169 A1 | 4/2004 | Dentler et al. |
| 2004/0098276 A1 | 5/2004 | Blazey |
| 2004/0129787 A1 | 7/2004 | Saito et al. |
| 2004/0138995 A1 | 7/2004 | Hershkowitz et al. |
| 2004/0148240 A1 | 7/2004 | Gulati et al. |
| 2004/0153663 A1 | 8/2004 | Clark et al. |
| 2004/0181671 A1 | 9/2004 | Brundage et al. |
| 2004/0189441 A1 | 9/2004 | Stergion |
| 2004/0230527 A1 | 11/2004 | Hansen et al. |
| 2004/0245330 A1 | 12/2004 | Swift et al. |
| 2004/0254890 A1 | 12/2004 | Sancho et al. |
| 2005/0039057 A1 | 2/2005 | Bagga et al. |
| 2005/0043961 A1 | 2/2005 | Torres et al. |
| 2005/0080717 A1 | 4/2005 | Belyi |
| 2005/0116025 A1 | 6/2005 | Davis |
| 2005/0127161 A1 | 6/2005 | Smith et al. |
| 2005/0149348 A1 | 7/2005 | Baum-Waidner |
| 2005/0154924 A1 | 7/2005 | Scheidt et al. |
| 2005/0230527 A1 | 10/2005 | Hansen et al. |
| 2006/0074986 A1 | 4/2006 | Mallalieu |
| 2006/0149674 A1 | 7/2006 | Cook et al. |
| 2006/0169785 A1 * | 8/2006 | Jones ........................ 235/491 |

FOREIGN PATENT DOCUMENTS

WO WO03/071396 8/2003

OTHER PUBLICATIONS

"A Discussion of Data Analysis, Prediction and Decision Techniques," Fair Isaac, May 2003, 95pp.
"Viisage Identity Solution Suite," web printout, 2 pp, no date.
"Viisage Proof," web printout, 1 p, no date.
"Viisage Proof: Features and Benefits at a Glance," web printout, 2pp, no date.
"Viisage Launches Innovative Identity Proofing Product," Press Release, Aug. 23, 2004, 2 pp.
"Viisage Unveils Vision for New Identity Solutions Product Suite, Creating New Paradigm for Ensuring Identity Authenticity," Press Release, Aug. 23, 2004, 2 pp.
"The Paper Chase: Give Me Your Paper. I'll Give You Mine." PowerPoint presentation at AAMVA Fraud Symposium, Nov. 2002, 23 pp.

(Continued)

*Primary Examiner*—Karl D. Frech
(74) *Attorney, Agent, or Firm*—Mintz, Levin, Cohn, Ferris, Glovsky and Popeo PC

(57) ABSTRACT

According to one aspect, the detailed technology concerns assessment of the fraud risk presented by an applicant for a driver's license, based on a particular ensemble of information presented by the applicant. For example, certain collateral identification documents presented by the applicant (birth certificate, passport, student body ID card, etc.)—or certain combinations of documents—may be found to have relatively higher or lower historical incidences of fraud associated therewith. Based on such historical insight, the issuing agency can tailor its scrutiny of the applicant accordingly. In one arrangement a score is determined based on the presented information. If it falls below a threshold, extra verification checks can be undertaken, such as querying additional third party databases (credit bureaus, military discharge records, etc.). An automated system may guide the evaluation process, based on the particular ensemble of information presented, and on the results of any database queries.

54 Claims, No Drawings

OTHER PUBLICATIONS

Opening Statement of Senator Richard J. Durbin, Hearing before the U.S. Senate Governmental Affairs Committee, Subcommittee on Oversight of Government Management, Restructuring, and the District of Columbia, Apr. 16, 2002, 5 pp.

Remarks of James Huse, Inspector General of Social Security Administration, to AAMVA Symposium on Motor Vehicle Fraud Prevention Initiatives, Nov. 15, 2002, 8 pp.

Testimony of Asa Hutchinson, Under Secretary, Department of Homeland Security, Before the Senate Committee on Finance, Sep. 9, 2003, 10 pp.

Sanders, Joe, "Identification Security for Driver Licensing, An International Effort," AAMVA Annual International Conference, Saskatoon, Saskatchewan, Aug. 2002, 24 pp.

"Evaluation of Current Practices," Virginia Dept. of Motor Vehicles, Sep. 2003, 69 pp.

"GAO Report Reveal Driver's Licensing Loopholes Risk National Security," AAMVA Press Release, Sep. 9, 2003, 2 pp.

Testimony of Keith Kiser, Chair, American Association of Motor Vehicle Administrators, Driver's License Security Issues, Submitted to the House Select Committee on Homeland Security, Oct. 1, 2003, 11 pp.

"Battling ID Theft, Lenders Mobilize Old Friends with New Technologies," Bank Systems & Technology Online, Apr. 28, 2003, 3 pp.

"Stop Identity Fraud," Brochure re LexisNexis Risk Wise InstantID, 2004, 2 pp.

"Superior Fraud Prevention," Brochure re LexisNexis RiskWise FraudDefender, 2004, 1 p.

ABA Bankers News, (article re LexisNexis RiskWise InstantID) Oct. 14, 2003, 1 p.

"Bankers Systems and LexisNexis RiskWise Partner to Deliver Compliance Knowledge and Fraud Prevention Expertise in IDFlag," Press Release, Bankers Systems, Inc., Feb. 6, 2003, 2 pp.

"San Diego Startup Makes a Name for Itself in the Identity-Theft Wars," San Diego Union-Tribune, Jun. 10, 2003, 3 pp.

"Acxiom Patriot Act Solutions," Oct. 2002, 9 pp.

Bigelow, "San Diego Startup Makes a Name for Itself in the Identity-Theft Wars," San Diego Union-Tribune, Jun. 10, 2003, 3 pp.

Clark, "Software Helps Spot Fraud in Fake Credit Applications," Wall Street Journal, May 14, 2003, 2 pp.

Ginovsky, ABA Bankers News, (article re LexisNexis RiskWise InstantID) Oct. 14, 2003, 1 p.

"GTAD Technology," from ID Analytics web page, Aug. 2004.

"ID Analytics and Primary Payment Systems Bring the ID Score to Retail Banking to Fight Identity Fraud" (press release) Aug. 19, 2003, 2 pp.

"ID Network," from ID Analytics web page, Aug. 2004.

"Identity Risk Management Solutions," from ID Analytics web page, Aug. 2004.

Norman, et al, "Peronicx Methodology," Acxiom Corporation, Jan. 2003, 14 pp.

"Optimization Technology," from ID Analytics web page, Aug. 2004.

Weatherford, Mining for Fraud, IEEE Intelligent Systems, Jul.-Aug. 2002, 3 pp.

Homeland Security System, ip.com Prior Art Database, Aug. 2002.

* cited by examiner

FRAUD PREVENTION IN ISSUANCE OF IDENTIFICATION CREDENTIALS

RELATED APPLICATION DATA

This application claims priority to provisional application 60/512,033, filed Oct. 17, 2003.

BACKGROUND OF THE INVENTION

Driver's licenses are widely used as proof of identity. With the increase in identity theft, there is a need to enhance the reliability of driver's licenses as an identity proof.

There are two classes of issuance systems for driver's licenses: over the counter (OTC) and central issue (CI).

Over the counter issuance systems print the license at the office where the applicant applied—usually while the applicant waits. The office is equipped with one or more data capture systems (e.g., photo camera, signature capture station, fingerprint sensor, etc.) and an ID card printer. After the applicant has established entitlement to a license, an operator captures a photo (and optionally a signature and/or a biometric, such as fingerprint), and causes a license to be printed. Data captured during the application process is relayed to a state database, where it can be used for law enforcement and other activities.

Central issue systems differ in that the license is not issued at the time of application. Instead, data is captured at the office, and sent to a central printing facility. That facility then prints the card and mails it to the applicant at the address printed on the license.

DETAILED DESCRIPTION

According to one aspect of the invention, systems are provided to combat fraud in the issuance of driver's licenses ("enrollment").

Prior to issuance of a driver's license, state officials (e.g., field agents in the state's Department of Motor Vehicles (DMV)) typically require production of two or three identification documents ("collateral" documents). Some states require that at least one of these documents provide some evidence of the applicant's age. Different jurisdictions have different requirements as to the type and number of collateral identification documents needed. Acceptable documents in one exemplary state include (but are not limited to):

1. Original or certified copy of birth certificate;
2. Military or armed forces ID card;
3. Military discharge papers;
4. Selective service registration card;
5. U.S. Passport;
6. Non-U.S. Passport;
7. Alien registration card;
8. Immigration or naturalization documents;
9. Adoption decree or adoption certificate issued by a court;
10. Canadian driver's license, instruction permit, or identification card;
11. Out-of-state driver's license, instruction permit, or identification card;
12. Department of Corrections age and identity letter (with photo)
13. Department of Corrections inmate identification card;
14. Mexican consular ID card;
15. Student body ID card;
16. Social Security card;
17. Vehicle title or registration;
18. Company identification card;
19. Pistol or firearms permit;
20. Liquor Control service permit;
21. Personalized check/statement, or savings account passbook;
22. Driver license renewal reminder;
23. Voter registration card;
24. Property tax statement;
25. W-2 tax form;
26. Medical or health card;
27. Department of Corrections release letter;
28. Parole papers;
29. Certified copy of school transcript;
30. Pilot's license;
31. Court papers or court orders, such as legal name changes;
32. Affidavit of identity by parent.

(Items 1-14 are accepted as proof of age.)

To applicant's knowledge, there has been no systematic study concerning patterns of use of collateral documents presented at the time of enrollment.

In accordance with one aspect of the invention, information is gathered concerning documents presented at the time of enrollment, and this data is later analyzed to determine which documents are most frequently (and/or most rarely) correlated with fraud in the enrollment process.

Fraud in the enrollment process may be detected at various times, including during attempted enrollment (e.g., through automated or manual checking conducted before the license is issued to the applicant), or later (e.g., through a police arrest of an individual found to be carrying multiple driver's licenses with the same photo but different names).

In one particular embodiment, relevant information is collected in a database, including identification of collateral documents presented during enrollment, and whether fraud has been associated with the license. As the database grows, increasingly accurate analyses can be performed to match certain collateral documents to fraud (or to certain types of fraud).

One type of analysis is correlation. A given enrollment document can be checked for its incidence of involvement in fraudulent and non-fraudulent license procurements. If the incidence for a particular type of collateral document deviates from the mean, use of that document can be regarded as being indicative of a higher, or lower, than normal possibility of fraud.

Consider a database of 10 million driver license records, with an overall fraud rate of 0.1%. Licenses for which a U.S. passport is presented as a collateral document may have an overall fraud rate of 0.02%, whereas licenses for which a student ID is presented as collateral may have an overall fraud rate of 1%. The passport evidently has a relatively strong negative correlation with fraud, whereas the student ID has a relatively strong positive correlation.

The example just given is a relatively simple one. Much more sophisticated analyses can be conducted.

One class of powerful analysis techniques is known as factor analysis. Such techniques consider a broad range of input variables, and assess their contributions (both individually and in conjunction with other input variables) to different results (e.g., incidence of fraudulent licenses, and arrests for speeding). (A number of books treat the subject in depth. A popular text is Kim et al, "Factor Analysis," Sage Publications, 1979.)

By applying factor analysis, outcomes contrary to the results given above may be discovered. For example, factor analysis may reveal that U.S. passports are positively correlated with fraud, if presented with a naturalization certificate as a companion collateral document. Likewise, student IDs may be found to be negatively correlated with fraud, if accompanied by an affidavit of an accompanying parent.

Factor analysis is an exercise in matrix mathematics and statistics. Another analytic technique relies on neural networks and so-called "fuzzy logic." These techniques look for patterns in data that might look random on casual inspection.

The foregoing techniques, and others, are used in the field of "data mining," for which many different software tools are available. The artisan is presumed to be familiar with such art.

The results of such analyses can be used in various ways. In one, state employees who issue driver's licenses are provided with the results, and instructed to spend relatively more or less time questioning an applicant depending on whether the collateral documents suggest (or not) an increased likelihood of fraud. Thus, personnel resources are deployed in a manner giving them a heightened fraud-fighting effect—with more of their time spent on cases where fraud is more likely.

The employees can be provided with the result data in tabular form (e.g., a listing of collateral documents that may trigger more or less scrutiny of an applicant), or the employee can be guided by a computer tool. In this latter arrangement, the user interface through which the employee annotates the DMV database record with information about the collateral documents used, can respond to the employee—based on the particular pair (or triple) of documents offered—and offer guidance as to actions the employee should, or needn't, take. Such arrangements may be regarded as expert systems—with expertise in reducing issuance of fraudulent licenses.

In one embodiment, the computer system computes a score that ranks the applicant, based on the forms of collateral ID produced. (As noted below, other variables may also factor into this computation.) The score thus serves as a figure of merit for the reliability of the collateral identification, on which different actions can depend.

Consider a scoring system that yields an average value of 100, with higher reliability scores indicating less likelihood of fraud. Persons scoring between 95 and 105 may be given a regular degree of scrutiny. Persons scoring less than 95 may be given progressively increasing amounts of scrutiny.

For example, if the collateral documents indicate a reliability score of 93, the DMV official may seek to corroborate identity by a fast, inexpensive, check. An example may be consulting a telephone directory database, to confirm that the name and address given to the DMV are consistent with information maintained by the local telephone company in their service records.

If the reliability score is 90 or less, the DMV official may seek to corroborate identity by a slower, perhaps more expensive check. For example, the official may solicit the applicant's social security number (if this isn't routinely provided as part of the enrollment process). When typed by the official into the DMV computer system, the system can check a federal social security database to confirm that a person by applicant's name was issued that social security number.

For a score of 87 or less, both the telephone directory and social security check may be utilized.

For a score of 84 or less, a still more rigorous check may be performed. For example, identifying information (e.g., name, address, social security number) can be passed to credit reporting agency, which responds with a credit report or credit score (e.g., FICO, an acronym for Fair Isaac & Company). This report is examined for consistency with the identifying information provided to the DMV official.

For a score of 81 or less, the foregoing checks may all be conducted and, in addition, the person's identifying information may be checked against local, state, and/or federal law enforcement databases.

(The scoring thresholds at which more rigorous verification is undertaken are, in the examples above, uniformly-spaced scores. More likely, these would be statistically-based brackets, e.g., based on standard deviation.).

These verification checks noted above needn't be manually initiated or conducted by the DMV employee; they can be undertaken automatically by a computer system. In some cases, the reliability score that triggers the checks isn't even provided to the DMV employee.

The foregoing are just a few examples of a great many verification procedures that may be performed. Some verification procedures may be tied to the particular forms of collateral identification offered by the applicant.

For example, if a military discharge certificate is offered, the DMV computer may consult with a federal database containing military service records to confirm that a person with applicant's name and birth date served in the military. (If additional data is captured from the collateral document—such as the discharge date—this information can be checked, also, against the military database.).

Likewise, if a W-2 tax form is presented, applicant's employment with the stated employer can be checked through on-line employment-reporting databases, such as a credit reporting bureau. (Again, to fully exploit such resources, it may be desirable to capture information from the collateral documents other than confirming applicant's name, and optionally address. In the W-2 case, the name of the employer could be captured and logged in the DMV database record, and used as an additional item for verification.).

If the applicant passes the applicable verification checks, the license may be issued in the normal way. If one or more checks gives anomalous or conflicting results, different action may be taken.

If the telephone directory search reveals no listing, the applicant may plausibly explain that they just moved into the jurisdiction and don't yet have telephone service. In such case, the protocol may involve attempting a different form of verification, such as the social security number check. Or the protocol may require the DMV official to solicit a third (or fourth) item of acceptable identification. A new reliability score can then be determined based on the enlarged set of collateral documents. If it still falls below 95, other checks can be run (e.g., the social security database check). If such other check(s) gives no cause for further suspicion, the driver's license can be issued in the normal course.

Some verifications may suggest that a fraud is being attempted, or that a crime has been committed. For example, consider an applicant who presents a savings account passbook as an element of identification. If the expert system—on considering the ensemble of proffered collateral documents—determines a reliability score of less than 90, the system may suggest that the official check (or the computer may itself check) with the issuing bank to confirm that the passbook is valid. On checking its records, the bank may report that the passbook was stolen during a house break-in.

Such a circumstance can trigger different responses. One is for the DMV official to advise the applicant that the computer system has flagged the application for further screening, and invite the applicant to return to the DMV office on the next business day to complete the process. (Optionally, the official may be requested to surreptitiously observe the applicant's vehicle as they depart the parking lot, and enter a description of the vehicle and/or license plate information.) Another response is to electronically send an alert to an appropriate law enforcement official while the person is at the counter, or to send the complete dossier of information collected from the applicant (either in real-time or later, e.g., overnight).

Another response is to issue a license. Although counter-intuitive, this step may be desirable from a law enforcement standpoint, e.g., transforming an attempted fraudulent procurement of a license into an actual fraudulent procurement offense. The issued license may be marked so as to indicate, to authorized inspectors such as law enforcement, that is it suspect (e.g., a different color background may be printed behind the facial portrait, or a bar code or watermark formed on the license may convey such an alert, etc). Or a conventional license may be issued, and remedial steps can be taken later to recover same (e.g., seizure, at the time of arrest for the suspected offense).

Other responses, and combinations of responses, can of course be used.

Naturally, frauds discovered through such checking in the enrollment process should be logged in the database so as to enhance the information on which the expert system decisions are based.

In some embodiments, frauds noted in the database may be given a confidence score. A fraud that is established through a court decision may be given a high confidence score. A fraud that is suspected but never verified (e.g., ambiguous verification results, with the applicant asked to return the next day but never returning) may be given a lower confidence score. Again, this confidence measure is another variable that can figure into the expert system data analysis.

Desirably, a rich set of data relating to each examination/verification procedure is collected and added to the DMV database. This information will allow even more accurate reliability scoring to be determined in the future. That is, the reliability scoring can be based not just on the two or three types of collateral identification documents presented at the time of application, but can also be a function of the results of various verification procedures. And over the course of months, as reports of fraud are added to the database, the relevance of certain verification factors can change from obscure to clear.

With sufficient experience, for example, the expert system may discern that certain verification check results—in combination with certain other circumstances (e.g., in combination with certain types of collateral documents)—may substantially change the statistical likelihood of fraud. Consider the applicant with an initial reliability score (based on the collateral documents alone) of 93. A telephone directory check is made. The check does not confirm applicant's information. The failure of this check can now be added into the set of data on which the system computes the score, yielding a modified score. The modified score—since it is a function of a richer set of input variables—permits more accurate categorization of the fraud risk.

Based on analysis of historical data, for example, the system may advise that failure of the telephone directory check changed the applicant's score from a 93 to an 84. This steep drop in score may be because the applicant used a corporate ID and a vehicle registration as collateral IDs, and these have historically been found to be associated with fraud in contexts where the telephone directory check is failed. (In contrast, if the applicant presented a pilot's license and a U.S. passport as collateral documents, the score might have only fallen to a 91, again based on historical patterns of experience.).

Thus, results from verification checks can be used as additional factors in assessing fraud risk.

Still other factors can be introduced into the assessment. One is credit history or scoring (e.g., FICO score). In the enrollment process, the DMV system may automatically solicit a FICO score from one or more of the credit reporting agencies (e.g., Equifax, Experian, TransUnion). If historical data stored in the DMV database includes such information for a meaningful number of prior applicants, the role of such a score as a factor in fraud can be determined, and used in establishing a reliability score for the application. (If the historical data is insufficient to do a rigorous analysis, then the FICO score might be used as a simple "plus" or "minus" factor. Thus, the reliability score of an applicant with a FICO score of more than 700 (on a scale extending to 850) may be increased by 2. The score of an applicant with a FICO score of below 450 may be decreased by 2.).

Another factor that can be included in assessing the reliability score is the applicant's age. Historical data compiled in the database may establish that applicants of different ages have different incidences of fraud. Again, the role of age as a factor in fraud can be mined from the data, and used as another variable in determining the reliability score. (Or, again, it can serve as a simple "plus" or "minus" factor, e.g., if the applicant is below 23 years old, his score is reduced by 2; if between 23 and 26 his score is reduced by 1; if over 70 his score is increased by 3; if over 80 his score is increased by 5.).

Many other factors may also be utilized in such systems, subject to applicable legal considerations. These may include gender, zip code, type or model year of car, birthplace, marital status, etc., etc.

Over time, a large set of data will be available in the data sources that are consulted to compute a reliability score (i.e., both the fraud database, and the ancillary verification sources). To further increase accuracy, trends in the data over time can be used in rendering the expert advice. For example, the Mexican consular card may have a relatively high historical incidence of fraud associated with it. However, further analysis may show that such fraud has dropped steeply in the past 9 months (e.g., due to redesign of the card, or re-working of the procedures for its issuance). Thus, in assessing risk, the historical high risk may be tempered with the better, recent, experience.

This trend analysis can be performed in various ways. One is to assess the data patterns over different periods to discern any notable variance. Thus, incidence of fraud may be computed over the life of the database (e.g., 0.2%), over the past two years (e.g., 0.1%), and over the past six months (e.g., 0.04%). Given these substantially different figures, the system can recognize that there is a shift underway in the statistics associated with this variable. Thus, the system may depart from its usual protocol (e.g., using data from the past 2 years), and instead use the average of the 2 year and the 6 month statistics (i.e., 0.07% in the case just given).

In some cases, it may be appropriate to extrapolate a trend. This may be particularly prudent in cases where the risk appears to be rising. Since the information in the database is necessarily from the past, a more accurate assessment of the current risk may be obtained by determining a trend curve, and estimating the current incidence of fraud by reference to that trend.

Consider a collateral document having fraud incidences over different window periods as follows:

| Data Window | Fraud Incidence |
| --- | --- |
| 12-9 months ago | 0.1% |
| 9-6 months ago | 0.13% |
| 6-3 months ago | 0.17% |
| 3 months ago-current | 0.22% |

Analysis of this data shows an exponential growth of about 30% per quarter. This figure can be applied to the historical data to obtain an estimate of the risk today.

For example, the mid-point of the most recent quarterly window is 1.5 months ago. Applying 1.5 months of 30% quarterly growth to the 0.22% figure from the most recent quarter yields an estimate of 0.25% today.

(More sophisticated analytic techniques take into account that the fraud data for the most current quarter is likely less comprehensive than that from successively older quarters, since less time has elapsed for fraud after issuance to be discovered and recorded (e.g., police stops and arrests). Thus, other techniques can apply trend analysis using a data confidence measure—relying more heavily on the data that has more indicia of reliability.).

The foregoing procedures were described in the context of over the counter issuance systems. Additional flexibility is available in central issue systems, since there is more time available to conduct verification checks.

In a central issue system, the expert system can consider the applicant over a period spanning hours or days. Many of the steps of the process may be performed at night, when database and bandwidth connection charges may be reduced. With the luxury of increased time, more comprehensive checking can be undertaken. Again, each check provides more data by which the applicant's reliability score can be further refined. If the process requires additional material from the applicant (e.g., a further piece of collateral identification), a letter can be mailed soliciting the information. Or a telephone solicitation can be made—either automated or by a human operator.

The database containing fraud data, which is mined as described above, needn't be limited to a single state. A larger sample set, and higher reliability results, may be obtained by using data from several states. This data can be assembled in a single database. Alternatively, several separate databases may be maintained, and consulted individually for the information needed for the analysis.

In some arrangements the reliability scoring can be performed by a public agency, such as a state department of motor vehicles. In others, the scoring can be performed by a private company—much like credit scores calculated by credit bureaus.

Another aspect of the technology involves tracking the contexts in which a particular driver's license is used. For example, if a driver's license is presented as a form of identification by a person cashing a check in New York, and the same license is presented an hour later by a traveler checking in for a flight at Los Angeles International Airport, then something is amiss.

Desirably, a record is captured each time a license is presented in a commercial or identification transaction. The record may be generated in various ways. For example, the license can be imaged, and technology applied to read the data on the card (e.g., OCR can be used to "read" text and barcode data, while steganographically encoded data can be decoded by suitable image processing). The license could also be swiped through a reader, that captured data from a magnetic stripe and/or optically encoded machine readable indicia on the card.

The license information—together with place and time of presentment—can be forwarded to a database. The database can be maintained by the state that issued the driver's license, or a centralized database can be used. (Such data capture is similar to the familiar practice used with credit cards, where every use is logged as to place and time.).

It is possible that such data collection may be mandated by legislation, seeking to thereby enhance national security. Alternatively, the data collection can be voluntary, with incentives provided to those who capture such data (and/or to those who assent to such capture from their licenses).

For example, a vendor who captures license data from persons who pay a bill by check and offer a license as identification, may be given preferential commercial terms than a competing vendor who does not do so. Thus, the former merchant may have less liability for accepting bad checks (insufficient funds), or may be charged a lower monthly account fee by the bank.

Similarly, the person presenting the license may be rewarded for allowing automated data capture. (Manual data capture is already widely accepted, e.g., a supermarket clerk writing a driver's license number on a check.) Again, in the checking case, lower fees may be offered. Alternatively, small cash rewards or other premiums may be available.

Once captured, analyses may be performed as to usage patterns for driver's licenses. One outcome of such analysis is flagging inconsistent usage scenarios, such as the one noted above (i.e., physical presentment of the same license in New York and California within an hour). When such inconsistent usage is detected, a responsive action can be taken (such as denying boarding to an aircraft).

Reference has been made to driver's licenses and state authorities. However, it will be recognized that the technology isn't so limited. Other articles of identification can be made more secure by the methods described above. And the issuers of the identification needn't be states—they can be other jurisdictions or entities, public or private.

I claim:

1. In a method of processing a request for an identification credential, the method including:
   receiving for inspection, from an applicant, a collateral identification credential; and
   obtaining photo image data of the applicant;
   an improvement comprising:
   receiving from the applicant at least two collateral identification credentials;
   capturing data from at least one of said received collateral identification credentials;
   capturing fingerprint data and signature data from the applicant;
   checking address information presented by the applicant, by reference to a database;
   conducting an analysis, based at least in part on said collateral identification credentials, said analysis yielding a score; and
   based on at least some of the foregoing, assessing an action that should be taken with regards to said applicant.

2. The method of claim 1 that includes determining that additional information should be solicited from the applicant prior to deciding whether an identification credential should be issued to said applicant.

3. The method of claim 1 that includes evaluating a result of said address information check as part of said analysis.

4. The method of claim 1 that includes assessing said action based on at least said address information check and based on said analysis of collateral identification credentials.

5. In a method of processing a request for an identification credential, the method including:
   receiving for inspection, from an applicant, a collateral identification credential; and
   obtaining photo image data of the applicant;
   an improvement comprising:
   receiving from the applicant at least first and second collateral identification credentials;
   capturing data from at least one of said received collateral identification credentials;
   capturing fingerprint data and signature data from the applicant;
   checking address information presented by the applicant, by reference to a database;
   based on at least information related to said first and second collateral identification credentials and said address checking, assessing whether an identification credential should be produced for said applicant.

6. In a method of processing a request for an identification credential, the method including:
   receiving for inspection, from an applicant, a collateral identification credential; and
   obtaining photo image data of the applicant;
   an improvement comprising:
   receiving from the applicant at least first and second collateral identification credentials;
   conducting an analysis, based at least in part on said first and second collateral identification credentials, to yield a score.

7. The method of claim 6 that includes presenting information related to said score to a credential issuing authority.

8. The method of claim 6 that includes using said score in determining whether to issue an identification credential to said applicant.

9. The method of claim 6 in which the first collateral identification credential is of a first type, and the second collateral identification credential is of a second, different, type, and in which said analysis includes consideration of historical data about fraud associated with the collateral identification credentials of said first and second types.

10. The method of claim 9 in which said analysis includes factor analysis.

11. The method of claim 9 in which said analysis includes trend analysis.

12. In a method of processing a request for issuance of a driver's license, the method including providing information associated with a particular applicant to an automated system, said system generating a score based thereon, wherein said score is based, at least in part, on information not unique to the particular applicant, but rather on information that legitimately may be associated with different applicants.

13. The method of claim 12 in which said reliability score comprises a relative figure of merit related to confidence that the applicant is who they purport to be, rather than a binary go, no-go assessment of identity.

14. The method of claim 12 that includes issuing guidance to an official involved in processing said request, based at least in part on said score.

15. The method of claim 12 that includes receiving from the applicant a particular combination of collateral identification credentials of different types, and said score is based, at least in part, on said particular combination of types.

16. In a method of processing a request for issuance of a driver's license, the method including providing information associated with a particular applicant to an automated system, and receiving guidance from said system based on said provided information to reduce the possibility of fraud, wherein said guidance is based, at least in part, on information not unique to the particular applicant, but rather on information that legitimately may be associated with different applicants.

17. The method of claim 16 in which said automated system is an expert system.

18. The method of claim 16 in which said guidance is also based on data provided from a database maintained by a third party, in response to a query that includes certain of the provided information.

19. The method of claim 18 in which the third party is a credit bureau.

20. The method of claim 18 in which the data provided from said database relates to address data.

21. The method of claim 18 in which the data provided from the database relates to employment data.

22. The method of claim 16 in which said guidance is also based on data from a database containing information on historical reports of fraud.

23. In a method of processing a request for a driver's license, the method including:
   receiving for inspection, from an applicant, a collateral identification credential; and
   obtaining photo image data of the applicant;
   an improvement comprising consulting data maintained by a third-party credit bureau about the applicant, and using said data in determining whether to issue an identification credential to said applicant.

24. In a method of processing a request for a driver's license, the method including:
   receiving, from an applicant, at least first and second collateral identification credentials; and
   obtaining photo image data of the applicant;
   an improvement comprising:
   automatically consulting an in-house database containing information useful in deterring fraudulent procurement of a driver's license;
   automatically consulting a database compiled by a third-party to check certain information received from the applicant; and
   using a result of said automatic database consultations in processing said request.

25. The method of claim 24 in which the third-party database comprises a telephone directory database.

26. The method of claim 24 in which the third-party database comprises a credit bureau database.

27. The method of claim 24 in which the certain information received from the applicant comprises address information.

28. The method of claim 24 in which the certain information received from the applicant comprises employment information.

29. The method of claim 24 in which the in-house database contains information relating to fraud associated with different types of collateral identification documents.

30. The method of claim 24 that also includes consulting a second, different third-party database to check other information received from the applicant, and using a result of said different database consultation in processing said request.

31. In a method of processing an applicant's request for issuance of a driver's license, the method including:
   receiving, from the applicant, at least first and second collateral identification credentials of first and second different types; and
   obtaining photo image data of the applicant;

an improvement comprising: receiving guidance from an automated system by which an issuing authority can make an informed decision to either (a) issue a driver's license, or (b) further check the applicant's identity, said guidance being based on multiple data sources, including (i) the particular types of collateral identification credentials received from the applicant, (i) verification of an applicant address, and (iii) verification of at least one other item of information about the applicant by reference to an external database.

32. In a method of processing a request for an identification credential, the method including receiving an ensemble of other identification credentials presented by an applicant, said credentials being of different types, an improvement comprising identifying the types of said credentials to an expert system, the expert system having previously been provided historical information about fraud corresponding to different types of credentials, said expert system employing said information in assessing a fraud risk associated with the ensemble presented by the applicant.

33. In a method of processing a request for an identification credential wherein an applicant presents at least first and second types of collateral identification, an improvement comprising identifying said types of presented collateral identification to an expert system, and receiving guidance about processing said request from the expert system based at least in part thereon.

34. In a method of processing a request for issuance of an identification credential, the method including receiving from an applicant an ensemble of information, an improvement comprising:
    determining a score based at least in part on some of the received ensemble of information;
    if the score does not meet a test, querying an external database for additional verification information;
    determining a revised score that takes into account a result from said query; and
    if the revised score meets a test, proceeding with the issuance process.

35. The method of claim 34 in which the querying comprises querying a database containing address information.

36. The method of claim 34 that further includes, if the revised score does not meet a test:
    querying a second external database for additional verification information;
    determining a re-revised score that takes into account a result from said second database query; and
    if the re-revised score meets a test, proceeding with the issuance process.

37. The method of claim 34 in which the ensemble of information received from the applicant includes a collateral identification document of a particular type, said particular type being among a group of approved document types, and the method includes selecting a particular external database to query from among a group of available external databases, said selection depending on the particular type of the received collateral identification document.

38. In a method of processing a request for issuance of an identification credential, the method including receiving from an applicant an ensemble of information that includes a collateral identification document, and storing information related thereto in a database, the collateral identification document including data of a first type that is required for issuance of the identification credential, and data of a second type that is not required for issuance of the identification credential, an improvement comprising capturing said second type of data from the collateral identification document, storing same in the database, and conducting an applicant verification check based in part on said second type of data.

39. The method of claim 38 in which said second type of data comprises an employer name.

40. The method of claim 38 in which said second type of data comprises a military discharge date.

41. In a method of processing a request for an identification credential by use of a central-issue identification credential issuance system, said system performing a method that includes:
    capturing applicant data at a first location;
    producing an identification credential at a second location different than the first; and
    mailing the produced identification credential to the applicant;
    an improvement comprising:
    receiving from the applicant information useful in verifying identity of the applicant;
    performing an initial verification procedure based on said received information;
    if said initial verification procedure is satisfactory, producing and mailing the identification credential;
    if said initial verification procedure is not satisfactory, undertaking a further verification procedure; and
    if said further verification procedure is satisfactory, producing and mailing the identification credential.

42. The method of claim 41 in which said further verification procedure includes consulting at least one database not consulted in said initial verification procedure.

43. The method of claim 41 in which said further verification procedure includes soliciting additional information from the applicant.

44. The method of claim 43 in which said further verification procedure includes telephoning the applicant.

45. The method of claim 43 in which said further verification procedure includes sending a request to the applicant by mail.

46. In a method of deterring fraud in issuance of primary identity credentials, an improvement comprising compiling data about the incidence of fraud associated with collateral identity credentials that may be presented by applicants in support of primary identity credentials.

47. The method of claim 46 that includes analyzing said compilation of data to yield information useful in assessing risk of possible fraud associated with particular combinations of collateral identity credentials.

48. The method of claim 47 that includes consulting said information when an applicant solicits issuance of a primary identification credential, and adapting a level of scrutiny based at least in part on said information.

49. A database method comprising:
    receiving data indicating that a primary identity credential for a particular person has been associated with fraud;
    identifying a type of collateral identity credential that was earlier used by the person to obtain said primary identity credential; and
    storing data in a database associating fraud-related data with said type of collateral identity credential.

50. The method of claim 49 that includes:
    identifying collateral identity credentials of at least first and second types that were earlier used by said person to obtain the primary identity credential; and
    storing data in the database associating fraud-related data with said first and second types of collateral identity credentials.

51. The method of claim 50 that includes, when a person solicits issuance of a primary identification credential and presents two more types of collateral identity credentials in support thereof, checking said database for fraud data associated with said types of collateral identity credentials, and taking action dependent thereon.

52. A method comprising:
  capturing data from a driver's license presented during a first commercial or identification transaction;
  reporting said transaction to a database;
  capturing data from a driver's license presented during a second commercial or identification transaction;
  reporting said transaction to a database; and
  flagging a suspicious usage of a driver's license based on said reported transactions.

53. The method of claim 52 in which said capturing includes capturing optical data from the license, and decoding the optical data to generate a license identifier.

54. The method of claim 53 in which said decoding comprises decoding digital watermark data from the optical data.

* * * * *